No. 698,999
Patented Apr. 29, 1902.
F. W. NICHOLSON.
SHADE FOR PHOTOGRAPHIC LENSES.
(Application filed Feb. 15, 1901.)
(No Model.)
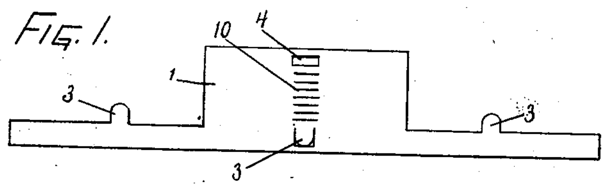
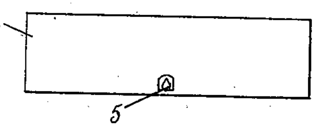
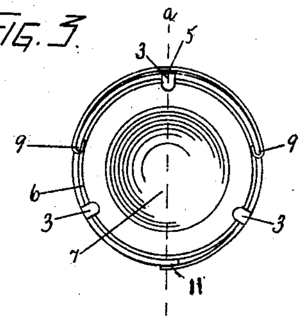
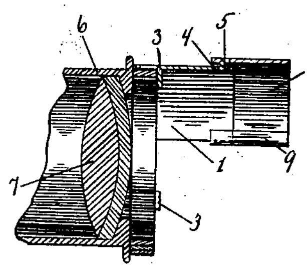
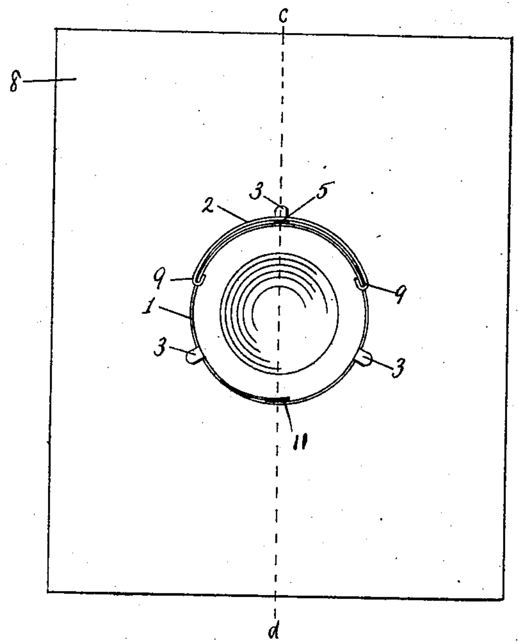
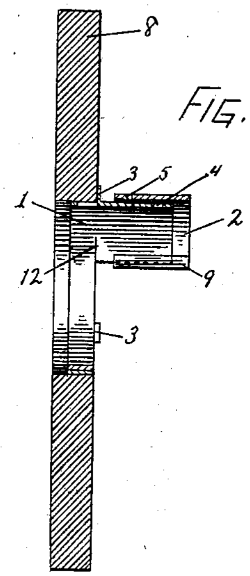
WITNESSES:
Harrie R. Brown
Harry W. Brown
INVENTOR
Frank W. Nicholson
BY
Chester W. Brown
ATTORNEY
THE NORRIS PETERS CO., PHOTO-LITHO., WASHINGTON, D. C.

UNITED STATES PATENT OFFICE.

FRANK W. NICHOLSON, OF JACKSON, MICHIGAN.

SHADE FOR PHOTOGRAPHIC LENSES.

SPECIFICATION forming part of Letters Patent No. 698,999, dated April 29, 1902.

Application filed February 15, 1901. Serial No. 47,470. (No model.)

*To all whom it may concern:*

Be it known that I, FRANK W. NICHOLSON, a citizen of the United States, residing at the city of Jackson, in the county of Jackson and State of Michigan, have invented certain new and useful Improvements in Shades for Photographic Lenses; and I do declare the following to be a full, clear, and exact description of the said invention, such as will enable others skilled in the art to which it appertains to make and use the same, reference being had to the accompanying drawings, and to the figures of reference marked thereon, which form a part of this specification.

My invention relates to shades for photographic and other lenses, and is particularly designed to shade the lens from the direct rays of the sun, flash-light, or any reflected light that might, by reflection from the surface of said lens or otherwise, form a halo, halation, or fog upon the negative-plate, and thereby injure the appearance and value of the resulting negative-image.

In general practice it is found to be impossible to take a photograph where the camera is required to be placed with the lens facing toward the sun, flash-light, or other strong reflected light without having a halo, halation, fog, or what are termed "ghosts" upon the negative unless the lens is properly shaded from said light. For this reason most photographers never take a picture under such circumstances and others shade the lens with whatever happens to be at hand, often not properly shading said lens and often cutting off part of the picture by holding the said article within the angle of the said lens.

The object of my invention is to provide a cheap, handy, simple, durable, and adjustable shade for all lenses, which may be quickly adjusted in place and which when so properly adjusted will properly shade the said lens from said light and prevent the halo, &c., which ordinarily takes place, other advantages being apparent from the following description.

In the accompanying drawings, forming a part of this specification, and in which like numerals of reference indicate similar parts, Figure 1 is a detail view of the shade as cut from a flat piece of metal before being formed. Fig. 2 is a similar view of the extension thereof. Fig. 3 is a front view of a lens-tube with the shade in position thereon. Fig. 4 is a section view of the lens tube and shade, Fig. 3, taken on the line *a b* of said Fig. 3. Fig. 5 is a front view of a kodak or other camera with the lens-shade in position in the opening in the front board thereof. Fig. 6 is a section view of same on the line *c d* of Fig. 5.

Referring now to the said drawings, the lens-shade proper, 1, is cut from a flat piece of metal (preferably spring metal) or other suitable material and is then formed into a circular shape, with the ends of the extensions or arms overlapping each other, as shown in Figs. 3 and 5. The clips or lugs 3 3 3 are either bent outwardly, as shown, Fig. 5, to bear against the surface of the front board, or may be bent inwardly, as shown in Fig. 3, to bear against the lens-tube. These lugs 3 3 3 by thus bearing against the lens-support prevent the shade from being forced too far upon the support and interfering with other working parts and also hold the said shade parallel to the axis of said lens, which is the proper working position therefor. The said shade is designed to be made slightly smaller than the lens-tube upon which it is to be used and is then sprung outwardly to pass thereon, and when released the spring in the said arms holds the said shade firmly in position thereon. For front boards not having lens-tubes the shade is made slightly larger than the opening therein and is placed thereon by springing the same inwardly until it passes within the said opening, and when the same is released the spring of the parts holds the shade in proper position therein. The extension 2 is likewise cut from flat metal and then formed in circular shape, and the edges are turned inwardly to form the grooves 9, adapted to slide upon the outside edges of the shade 1 in its movement forward and backward to increase or diminish the length of the operative shade, as desired. On the said shade 1 I have constructed at 10 a scale to indicate the distance the extension is drawn out and for convenience in resetting it at any desired position. I have also formed the tongue in said extension at 5, which is adapted to press against the shade 1, and thereby hold the extension in whatever position it may have been set. The said tongue is also adapted to engage with the opening 4 in the shade to limit the forward movement of the said extension and also to prevent the said extension from becoming detached or separated from the said shade and lost or misplaced.

In Fig. 3, 6 represents the lens-tube, about which the shade clasps, and 11 shows the point at which the arms thereof lap by one another, while 7 represents the lens.

In Figs. 5 and 6, 8 represents the front board of the camera in the opening in the front of which the shade is inserted. At 12 in Fig. 6 I have shown a variation in which the arms or extensions which clasp about the opening in the said front board are cut up into the body of said shade. This gives a longer spring to said arms, and they maintain a more perfect circular form as they are sprung inwardly or outwardly to engage with said cameras.

In operation the shade is sprung into engagement with the lens-tube or front board of the camera, as aforesaid, with the forwardly-projecting portion on the side toward the light from which it is desired to shade the said lens. The scene which it is desired to photograph is then focused upon the ground glass or otherwise, and the extension of the shade is drawn forward until it screens the front surface of the lens from the said light from which it is desired to shade it, care being taken that it is not drawn forward far enough to come within the angle of the lens and cut off any portion of the picture. The lens is then properly shaded, and the picture may be taken in the usual way without fear of ghosts.

As will be seen, the shade may be employed to screen the lens from light coming from any direction, may be adjusted to any length required, may be made of any desired size, is cheap in cost, easy to manufacture, simple to operate, is light, durable, and may be instantly put on or taken off, is adjustable to different focal length of lenses, and by reason of its being a segment may be drawn farther forward without casting a shadow on the plate.

What I claim is—

1. A lens-shade for cameras consisting of a single piece of yielding material including depending arms whereby the shade may be sprung into engagement therewith, and each of said arms being provided with an offstanding projection adapted to bear against the camera.

2. A lens-shade for cameras consisting of a single piece of yielding material including depending arms whereby the shade may be sprung into engagement therewith, and each of the said arms provided with an offstanding projection adapted to bear against the camera, one of said arms arranged to overlap the other at its free end when the shade is in operative position.

3. A lens-shade consisting of a plate provided with yielding extensions for engagement with a camera or the like; and a second plate detachably and slidably mounted upon the first-mentioned plate.

4. A lens-shade consisting of a plate having yielding extensions for engagement with a camera or the like; a second plate disposed upon the first-mentioned plate; grooves upon the edges of one plate adapted to receive the edges of the other plate whereby one of the plates may have a sliding movement with relation to the other; and means for limiting the sliding movement of the sliding plate.

5. A lens-shade consisting of a plate provided with yielding extensions for engagement with a camera or the like; a second plate slidably and detachably mounted upon the first-mentioned plate; and means for limiting the sliding movement of the second plate.

6. A lens-shade consisting of a single piece of metal bent in the form of an arc of a circle having yielding extensions adapted to engage a camera or the like; a second curved plate bent to form the arc of a circle and detachably and slidably mounted upon the first-mentioned plate.

7. As a new article of manufacture, a lens-shade provided with spring members whereby the shade may be sprung into engagement with the lens-holder of a camera or the like, the shade having an extension adjustable longitudinally thereto.

8. As a new article of manufacture, a lens-shade provided with gripping members for detachably securing the shade to a camera or the like, the shade provided with an adjustable sliding extension.

9. In a device of the class described, a photographic lens-shade consisting of a curved plate of a shape similar to a section of a hollow cylinder, having circular arms or extensions to engage the lens-support, and a similarly-shaped plate having a slideway, and adapted to engage said first-named plate and slide forward and backward thereon.

10. In a device of the class described, a shade for photographic or other lenses consisting of a curved plate of a shape similar to a section of a hollow cylinder, having arms adapted to engage the lens-support, and having lugs to bear against said support; a second plate of a shape similar to said first-named plate, grooves at the edges of one plate adapted to receive the edges of the other plate, and for said other plate to engage therewith, and to slide forward and backward therein; a tongue upon one plate in spring contact with the other plate, and adapted to engage an opening in said other plate; a scale upon one plate to indicate the position of said other plate with reference thereto.

In testimony whereof I have hereunto set my hand this 1st day of February, 1901.

FRANK W. NICHOLSON.

Witnesses:

C. L. HERRICK,

M. J. MCCOLL.